United States Patent
Wilson et al.

(10) Patent No.: US 7,987,347 B2
(45) Date of Patent: *Jul. 26, 2011

(54) SYSTEM AND METHOD FOR IMPLEMENTING A ZERO OVERHEAD LOOP

(75) Inventors: Sophie Mary Wilson, Cambridge (GB); Timothy Martin Dobson, Cambridge (GB)

(73) Assignee: Broadcom Corporation, Irvine, CA (US)

( * ) Notice: Subject to any disclaimer, the term of this patent is extended or adjusted under 35 U.S.C. 154(b) by 208 days.

This patent is subject to a terminal disclaimer.

(21) Appl. No.: 11/643,998

(22) Filed: Dec. 22, 2006

(65) Prior Publication Data

US 2008/0155236 A1 Jun. 26, 2008

(51) Int. Cl.
*G06F 9/00* (2006.01)
(52) U.S. Cl. .................. 712/241; 712/E9.016
(58) Field of Classification Search .................. 712/241, 712/E9.016
See application file for complete search history.

(56) References Cited

U.S. PATENT DOCUMENTS

| | | | |
|---|---|---|---|
| 4,541,048 A * | 9/1985 | Propster et al. ................ 712/32 |
| 5,617,574 A * | 4/1997 | Boutaud et al. ................ 712/200 |
| 5,664,159 A * | 9/1997 | Richter et al. .................. 703/23 |
| 5,687,375 A * | 11/1997 | Schwiegelshohn ........... 717/129 |
| 5,727,194 A * | 3/1998 | Shridhar et al. ............... 712/241 |
| 5,734,880 A * | 3/1998 | Guttag et al. .................. 712/221 |
| 6,026,484 A * | 2/2000 | Golston ......................... 712/226 |
| 6,085,315 A * | 7/2000 | Fleck et al. .................... 712/241 |
| 6,188,411 B1 * | 2/2001 | Lai ................................ 345/559 |
| 6,253,307 B1 * | 6/2001 | Boutaud et al. ............... 712/209 |
| 6,269,440 B1 * | 7/2001 | Fernando et al. ............. 712/241 |
| 6,286,135 B1 * | 9/2001 | Santhanam .................... 717/146 |
| 6,367,071 B1 * | 4/2002 | Cao et al. ...................... 717/160 |
| 6,687,813 B1 * | 2/2004 | Norman et al. ............... 712/241 |
| 7,159,103 B2 * | 1/2007 | Ahmad et al. ................ 712/241 |
| 7,272,704 B1 * | 9/2007 | Nguyen et al. ................ 712/241 |
| 2003/0074650 A1 * | 4/2003 | Akgul et al. .................. 717/129 |
| 2003/0200423 A1 * | 10/2003 | Ehlig et al. .................... 712/228 |
| 2004/0003219 A1 * | 1/2004 | Uehara .......................... 712/241 |
| 2004/0193858 A1 * | 9/2004 | Ahmad et al. ................ 712/241 |
| 2006/0095751 A1 * | 5/2006 | Bybell et al. .................. 712/241 |
| 2006/0107028 A1 * | 5/2006 | Meuwissen et al. .......... 712/241 |
| 2007/0186084 A1 * | 8/2007 | Chiba ............................ 712/241 |
| 2008/0141013 A1 * | 6/2008 | Klima et al. ................... 712/241 |
| 2008/0155237 A1 * | 6/2008 | Dobson et al. ................ 712/241 |
| 2008/0178160 A1 * | 7/2008 | Brock et al. ................... 717/129 |
| 2009/0150658 A1 * | 6/2009 | Mizumo ........................ 712/241 |
| 2009/0327674 A1 * | 12/2009 | Codrescu et al. ............. 712/241 |
| 2010/0211762 A1 * | 8/2010 | Saha et al. .................... 712/205 |

OTHER PUBLICATIONS

"Techniques for Effectively Exploiting a Zero. Overhead Loop Buffer" Authors: Gang-Ryung Uh.; Yuhong Wang.; David Whalley.; Sanjay Jinturkar; Chris Burns; Vincent Cao; Publisher: Springer-Verlag London, UK; pp. 157-172, Jan. 1, 2000.*

(Continued)

*Primary Examiner* — Idriss N Alrobaye
(74) *Attorney, Agent, or Firm* — Sterne, Kessler, Goldstein & Fox PLLC (57) ABSTRACT

Systems and methods for implementing a zero overhead loop in a microprocessor or microprocessor based system/chip are disclosed. The systems and methods include the use of a breakpoint mechanism which is additionally used in debugging in order to provide some of the looping functionality.

4 Claims, 5 Drawing Sheets

OTHER PUBLICATIONS

"Zero-overhead loop controller that implements multimedia algorithms" Authors: Kavvadias, N.; Nikolaidis, S.; Publisher: Computers and Digital Techniques, IEE Proceedings; pp. 517-526; Publication Date: Jul. 8, 2005.*

"Effective exploitation of a zero overhead loop buffer" Authors: Uh, G.R.; Wang, Y.; Whalley, D; Jinturkar, S.; Burns, C.; Cao, V.; pp. 10-19, Publisher: ACM NY, NY, USA; Publication date: Oct. 17, 2003.*

"Application of Zero Overhead loop and Address Generator in General Purpose Computing", Author: Jinyung Namkoong; EE 482A Project Spring 2000, Standford University; pp. 1-14.*

* cited by examiner

SYSTEM AND METHOD FOR IMPLEMENTING A ZERO OVERHEAD LOOP

BACKGROUND OF THE INVENTION

1. Field of the Invention

The present invention is generally directed to microprocessor devices. In particular, the present invention relates to microprocessor devices which provide a hardware implementation of a loop.

2. Background

Conventional loop implementations use processor instructions to test for a defined condition. If the condition is met, a program counter indicating the address of the next instruction to be processed is configured with the address of the first instruction within the loop. The loop's instructions are processed until an instruction triggering the test is reached, and the process is repeated until the condition is no longer met. The need to test the condition and reconfigure the program counter adds overhead to the loop operation, and this overhead is incurred on each iteration through the loop. Testing the condition usually requires checking a counter, which must also be decremented each time the condition is tested, further increasing overhead. Loops are used in many applications, and such frequent usage compounds the effects of the loop overhead. Eliminating the loop overhead promotes speed benefits throughout most code.

One solution available in the art is the use of zero overhead loops ("ZOLs"). Zero overhead loops are typically implemented in processor systems using dedicated hardware created expressly for the purpose of eliminating loop overhead. Such implementations are sometimes found in digital signal processors ("DSPs"). A micro-architecture capable of natively supporting zero overhead loops is not always available, and is uncommon in many other processor systems.

Additional prior art solutions incorporate the use of branch target caches to reduce or eliminate inefficiencies caused by branching instructions. However, such prior art implementations require the filling of a branch target cache the first time an unexpected branch is encountered, resulting in overhead.

Accordingly, what is desired is a system and method that resolves the problem associated with the presence of decrement, test, and branch overhead by implementing ZOLs using an existing micro-architecture.

BRIEF SUMMARY OF THE INVENTION

The present invention is directed to a method, system, and a breakpoint mechanism for processing loops without incurring an overhead processing penalty. An implementation of the present invention uses a breakpoint unit together with some additional logic in order to support the execution of loops in hardware without incurring any overhead. Whereas a breakpoint unit is traditionally used for the purpose of debugging an application, it is used in a novel way in an embodiment of the present invention in order to define the boundaries of a loop and cause the looping to take place. An additional implementation of the present invention includes logic to fill a branch target cache at the start of a loop to eliminate overhead associated with filling the branch target cache upon reaching the bottom of the loop. This zero overhead loop architecture achieves significant benefits in applications in which loops are executed many times, causing a significant overhead to be incurred in the processing of loop conditional statements. Furthermore, the loop architecture achieves benefits even in low iteration count loops due to its efficient use of the branch target cache.

In accordance with an embodiment of the present invention, a method of processing a series of instructions within a loop is defined in which a program counter is compared to a breakpoint, and if the program counter and breakpoint are the same, and a counter indicates that the loop must be processed at least once more, then the program counter is set to an address for the first instruction in the series of instructions within the loop, and the counter is decremented. The instruction at the program counter address is processed. The next one or more instructions to be processed after the program counter is equal to the breakpoint are retrieved and placed into one or more pipeline stages within a processor. In an embodiment, at least one of the steps of comparing the program counter to the breakpoint and setting the program counter are performed in parallel to processing the instruction at the program counter, thereby reducing delay in processing a subsequent instruction.

In accordance with a further embodiment of the present invention, a system for processing a series of instructions within a loop consists of a program counter register that stores an address for an instruction currently being processed; a loop counter register that stores a number of times to process the series of instructions within the loop; a loop start register that stores the address of the first instruction to execute within the series of instructions; a breakpoint comparator, which itself consists of a breakpoint address configured with the address of the last instruction within the series of instructions and a comparator configured to compare the breakpoint address with the address stored in the program counter; a pipeline comprising a plurality of pipeline stages; and a branch-target cache configured to retrieve one or more instructions for one or more of the plurality of pipeline stages. In an embodiment, the breakpoint comparator sets the program counter register to the address specified by the loop start register when the comparator determines that the breakpoint address matches the address stored in the program counter register and the loop counter register indicates that the loop needs to be processed again. In a further embodiment, the branch-target cache retrieves the one or more instructions for each of the one or more of the plurality of pipeline stages from the instructions within the loop beginning at the address specified by the loop start register. Persons skilled in the relevant art(s) will appreciate that other memory structures may be used instead of registers. Persons skilled in the relevant art(s) will further appreciate that data shown as contained in separate registers may actually be packed into a single register while retaining its individual meaning.

Furthermore, a breakpoint mechanism in accordance with an embodiment of the present invention consists of a loop count register that stores a number of times to process instructions in the loop and a loop start register that stores a location of a first instruction in the loop. The breakpoint mechanism also contains a comparator configured to compare a current address of a program counter to the breakpoint address, wherein the comparator is operable to transmit a message indicating that the program counter matches the breakpoint address. Furthermore, logic is implemented within the breakpoint mechanism such that, if the breakpoint logic receives a message from the comparator indicating that the program counter matches the breakpoint address, it consults the loop count to determine whether the loop should be processed again. If so, the breakpoint logic consults the loop start register in order to determine the address of the next instruction for processing, and updates the program counter accordingly.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

A. Introduction

Common to many applications is the usage of loops in order to execute a segment of code repeatedly without duplicating instructions in an instruction memory. Such loops are typically performed in software. Performing loops in software requires the maintenance of one or more variables for testing a loop condition, used to determine whether to perform the sequence of instructions within the loop again or to exit the looping structure. When a looping condition occurs in software, there is usually significant overhead associated with the condition test when a loop is executed. One solution in the art involves the use of dedicated hardware to implement zero overhead loops. Although such an implementation remedies the deficiencies of certain software loops, it relies on the existence of specialized hardware available to a software developer.

As will be described in more detail below, an embodiment of the present invention utilizes readily available breakpoint match hardware located within a microprocessor, supplemented with hardware for performing a decrement and test operation, in order to implement a zero overhead loop that avoids the aforementioned shortcomings of conventional software-bound loop implementations. The use of breakpoint match hardware for debugging software operations is known. In a conventional microprocessor implementation, breakpoint match hardware is configured with an address within instruction memory that indicates where a break in the execution of a code segment should occur. When this break is detected by comparing a program counter ("PC") holding an address of a current instruction against the address within the breakpoint match hardware, the breakpoint match hardware modifies the value of the PC to that of a start address at which execution will be continued. In a typical system used for debugging, the start address is a subroutine that allows the operator to visualize the current state of the system. As will be described in more detail below, an embodiment of the present invention uses breakpoint match hardware in a manner that goes beyond this typical usage to implement a zero overhead loop.

B. Mechanism of Zero Overhead Loops

Figure 1:
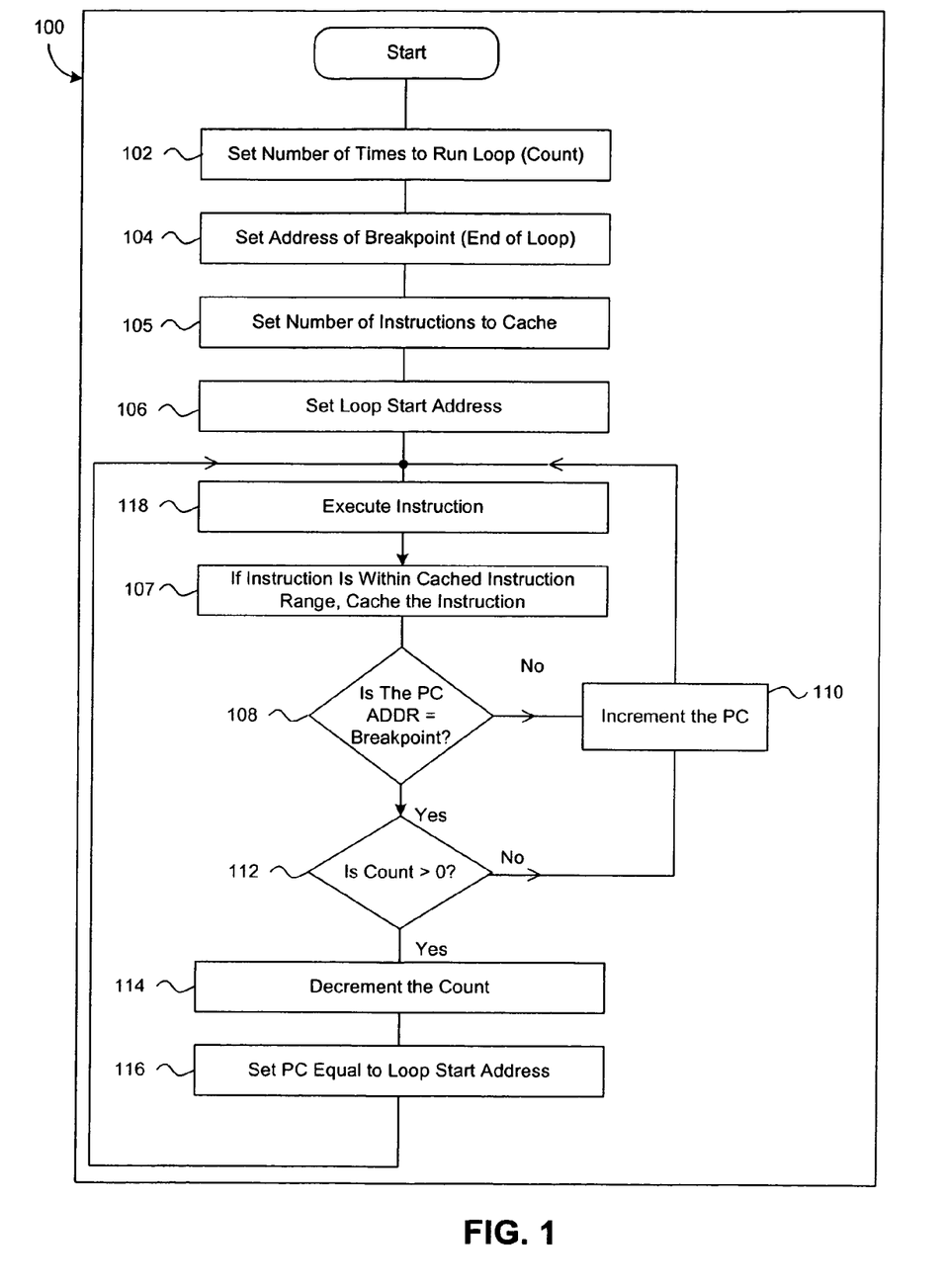
FIG. 1 illustrates a flowchart of a method for performing a loop in accordance with an embodiment of the present invention.

FIG. 1 depicts a flowchart 100 illustrating steps used by an example zero overhead loop ("ZOL") system in accordance with an embodiment of the present invention. The invention, however, is not limited to the description provided by the flowchart 100. Rather, it will be apparent to persons skilled in the relevant art(s) from the teachings provided herein that other functional flows are within the scope and spirit of the present invention.

The ZOL system requires that parameters defining a loop be configured by a user in anticipation of the loop's usage. This is done by setting a number of times to run the loop ("count") as shown at step 102, by configuring a breakpoint address corresponding to the end of the loop as shown at step 104, by setting a number of instructions to cache at step 105, and by entering a start address for the loop at step 106. In accordance with an embodiment of the present invention, the start address is an absolute address of the first instruction in the loop. It will be apparent to persons skilled in the relevant art(s) from the teachings provided herein that other parameters to identify the bounds of the loop are within the scope and spirit of the present invention. At this point, it is also useful to load a branch-target cache with one or more instructions from the start of the loop as they are processed in order to eliminate overhead associated with subsequent loading, in accordance with an embodiment of the present invention. Use of the branch-target cache is described further in Section D.

After configuring loop parameters in steps 102, 104, 105 and 106, a present instruction is executed as shown at step 118. The present instruction is the next instruction slated for execution by a program counter ("PC"). This instruction may occur anywhere within a code sequence, either inside or outside of the loop as defined by the loop parameters in steps 102, 104, 105, and 106. If the instruction occurs within the loop, and furthermore is one of the first few instructions subsequent to the loop start address 106, it may be cached at step 107. The instruction is cached at step 107 if its address is within the range defined by the loop start address 106 and the loop start address 106 plus the number of instructions to cache defined in step 105. One skilled in the relevant arts will appreciate that steps 118 and 107 may be performed in any order, and further that it is not necessary that either step be completed prior to the performance of the other step.

The address of the present instruction as identified by the PC (or any other mechanism by which the address of the present instruction is determined) is then compared in step 108 to the address stored in the breakpoint. If the PC address is not the same as the breakpoint address it means that the present instruction is not the last instruction in a loop. Since the instruction is therefore just one of a set of instructions to be executed sequentially, the next step shown at 110 requires that the PC be incremented, that the next instruction be executed at step 118, and so on. Persons skilled in the relevant art(s) will appreciate that even though step 110 indicates that the PC is incremented, the step could involve any number of mathematical operations not limited to an addition in order to obtain an instruction which follows the present instruction. Step 110 is meant to convey that the PC is manipulated in order to point to the next logically occurring instruction within a sequence of instructions slated for execution.

If the PC address is equal to the breakpoint address as determined in step 108, then the count is checked for a value greater than zero as shown at step 112. Persons skilled in the relevant art(s) will appreciate that the count does not necessarily have to decrement toward zero, but that this is only an example of a convention used to indicate a remaining number of iterations through the loop and any other similar counting method can be substituted. If the count value is equal to zero, this indicates that it is no longer necessary to perform another iteration of the loop and control proceeds to step 110 in a similar manner as described above. At step 110, as before, the PC is incremented, the next instruction is executed at step 118, and so on.

If the value of the count is greater than zero, then the count is decremented by one as shown at step 114. As suggested above, persons skilled in the relevant art(s) will appreciate that step 114 references the procedure of indicating that an iteration of the loop has been completed, and any number of counting methods can be substituted which may not necessarily involve decrementing the count, and the present invention encompasses all such possible counting methods. For example, in accordance with an embodiment of the present invention, the count may be decremented in step 114 prior to checking the count in step 112. One skilled in the relevant arts will appreciate that decrementing the count as shown at step 114 may be performed in parallel to other operations.

The PC is then set to the value of the loop start address, as shown at step 116, in accordance with an embodiment of the present invention. With the PC set to the new address, execution continues as normal in step 118 at the new address. Persons skilled in the relevant art(s) will appreciate that there are additional means by which the same procedure may be accomplished.

C. Using Zero Overhead Loops to Optimize Loop Performance

Using the breakpoint match hardware to perform the loop test solves the problem of overhead created by performing a test in software on every iteration of the loop in order to determine whether another iteration is necessary. With the breakpoint, counter, and loop start address information located within specialized hardware, the effect is that the loop test occurs in zero clock cycles, thus creating no overhead.

However, this alone does not completely eliminate the overhead caused by looping. When a breakpoint is encountered and the PC set to point to the first address in the loop, that instruction must be fetched and run through the processing pipeline.

Figure 2:
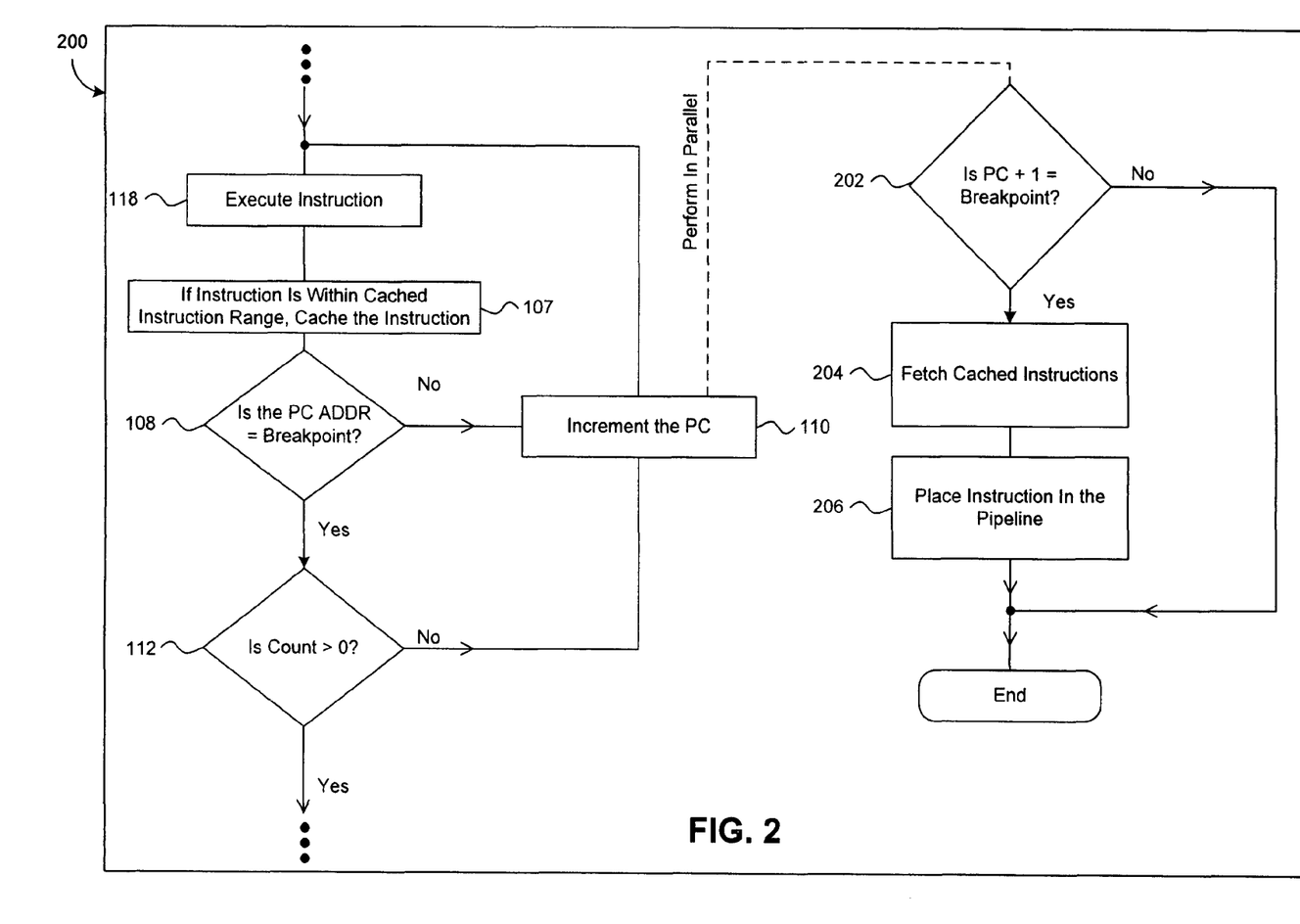
FIG. 2 illustrates a branch of the flowchart depicted in FIG. 1.

FIG. 2 depicts a flowchart 200 illustrating further steps used by an example ZOL system in accordance with an embodiment of the present invention that mitigates overhead associated with processing an instruction out of sequence due to looping. Steps 107, 108, 110, 112, and 118 as shown on the left side of flowchart 200 are identical to the steps bearing the same numbers in FIG. 1. At step 110, when the PC is incremented following a failure to find a requirement to loop back to the first instruction in the loop, the flowchart 200 in FIG. 2 diverges from what is shown in the flowchart 100 in FIG. 1. Steps 202, 204, and 206 are performed in parallel to the steps depicted in FIG. 1.

At step 202, the address of a next sequentially occurring instruction is obtained by adding an offset corresponding to a single address to the address held in the PC, as represented by the operation "PC+1". The resulting address is compared to the address of the breakpoint in order to determine whether the next instruction to be processed is the final instruction in the loop. Persons skilled in the relevant art(s) will appreciate that the primary purpose of step 202 is to determine a potential future execution path through a code segment, and the addition can be that of an offset of one or more single addresses to the address held in the PC. Furthermore, persons skilled in the relevant art(s) will appreciate that the process of advancing the instruction referenced by the PC may not necessarily involve an addition and this is a simplification for the purpose of clarity used to illustrate one way in which a PC is operable to reference the next instruction in a sequence of instructions.

If the breakpoint is not identified as occurring at the address of the next sequentially occurring instruction, then the parallel flow shown in 200 is ended. If the next sequentially occurring instruction is the instruction located at the address corresponding to the breakpoint address, then the instruction located at the start of the loop is fetched, or retrieved from a cache memory location as shown in step 204. The fetched instruction corresponds to the first of any instructions cached at step 107. In accordance with an embodiment of the present invention, the instruction located at the start of the loop is the instruction located at an absolute address specified by the loop start address. In accordance with an additional embodiment of the present invention, the instruction located at the start of the loop is the instruction located at the breakpoint address minus an offset specified by the loop start address. This instruction corresponds to the first instruction within a series of instructions that, together, constitute the loop. Persons skilled in the relevant art(s) will appreciate, as noted above, that step 204 can retrieve as many instructions from the cache as available in order to obtain an optimal number of instructions to fill all available execution streams, such as pipelines. In step 206, any instructions obtained in step 204 are then pushed into a pipeline so that they are processed once the breakpoint is reached and the PC is set to the address of the first instruction fetched in step 204.

The benefit of fetching instructions as shown in step 204 relates to the delay caused by underutilized pipelines. A pipeline, as known in the art, consists of multiple stages, each stage contributing to the processing of an instruction. An instruction is received within a first stage of a pipeline and passed along to subsequent stages of the pipeline, each stage performing more of the work necessary to achieve the result requested by the instruction. When a branch occurs, such as that caused by a breakpoint in the ZOL system, any instructions which occur sequentially after the instruction located at the address of the breakpoint will be in the pipeline waiting to be executed. Because a branch has occurred, however, it is not necessary nor desirable that those instructions be executed. When a breakpoint is found, the correct instructions (those located at the start of the loop) can be quickly loaded into the pipelines as they have been previously fetched and temporarily retained without incurring any overhead.

D. Implementing Zero Overhead Loops in Hardware

By implementing ZOL in hardware, the methods described above are utilized to optimize devices which require highthroughput data processing, in accordance with an embodiment of the present invention. Signal processing technology is one such example in which a loop used to perform a sequence of instructions repeatedly may generate a large amount of wasted processing in setting up and carrying out the loop itself, relative to the processing devoted to the instructions that comprise the loop.

Figure 3:
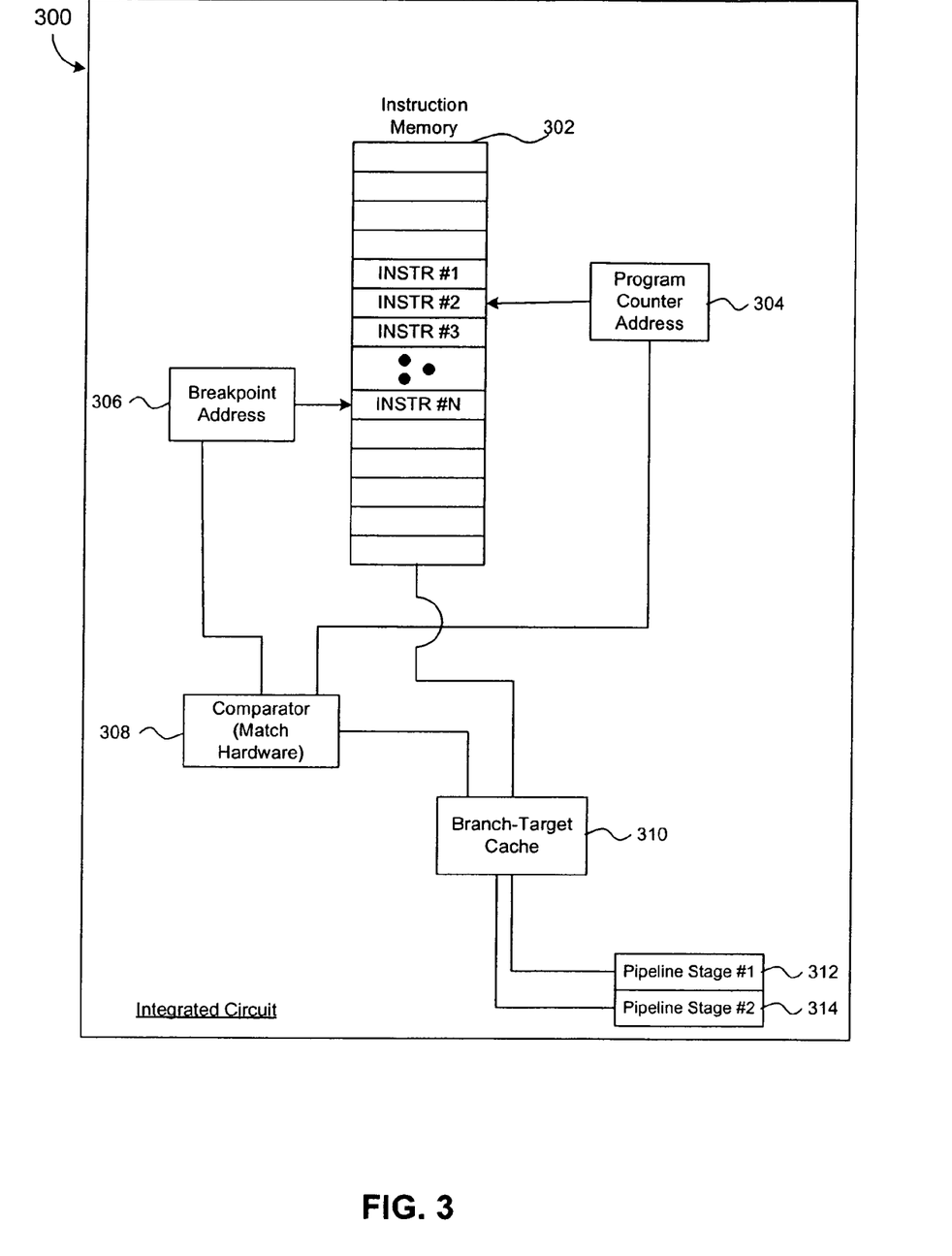
FIG. 3 depicts a system view of a zero overhead loop implementation in accordance with an embodiment of the present invention.

FIG. 3 depicts an integrated circuit 300 that contains an example system for performing a ZOL in hardware in accordance with an embodiment of the present invention. As shown in FIG. 3, integrated circuit 300 includes an instruction memory 302, a PC address register 304, a break point address register 306, a comparator 308 (also referred to as the "breakpoint-match hardware"), a branch-target cache 310, and first and second pipeline stages 312 and 314, respectively.

Instruction memory 302 stores a code segment in which individual instructions that comprise the code segment reside at unique addresses. PC address register 304 stores an address representing a particular instruction within the code segment residing in the instruction memory 302. This particular instruction is the instruction which is currently being executed by a processor. As previously indicated and as shown in step 110 of FIG. 1, PC address register 304 is incremented in order to reference an instruction which sequentially follows the currently executing instruction.

Breakpoint address register 306 stores an address representing another particular instruction (the "breakpoint") within the code segment residing in instruction memory 302. The breakpoint is set to the address of the last instruction within the loop. Once the breakpoint is reached, if the loop needs to be executed again, then the following instruction to be processed is the instruction at the beginning of the loop. Otherwise, the instruction which sequentially follows the breakpoint will be executed.

Comparator 308 is implemented in order to determine when the breakpoint has been reached. Comparator 308 receives the address from breakpoint address register 306 and the address from PC address register 304 and determines whether both represent the same address, as shown in step 108 of FIG. 1. If comparator 308 determines that breakpoint address register 306 and PC address register 304 contain different addresses, then the value of PC address register 304 is incremented, as shown in step 110 of FIG. 1. If breakpoint address register 306 and PC address register 304 contain the same address, however, then branch-target cache 310 is notified.

Once branch-target cache 310 receives a notification from comparator 308 that the breakpoint has been reached, a sequence of instructions from the beginning of the loop, residing in instruction memory 302, are loaded from their cache, as shown in step 204 of FIG. 2. These instructions are then placed in corresponding pipeline stages 312 and 314 as shown in step 206 of FIG. 2. Persons skilled in the relevant art(s) will appreciate that branch-target cache 310 and pipeline stages 312 and 314 are optional, but can provide an improvement in the rate of instruction processing when instructions from the beginning of the loop are placed into pipelines in advance of the branching.

Figure 4:
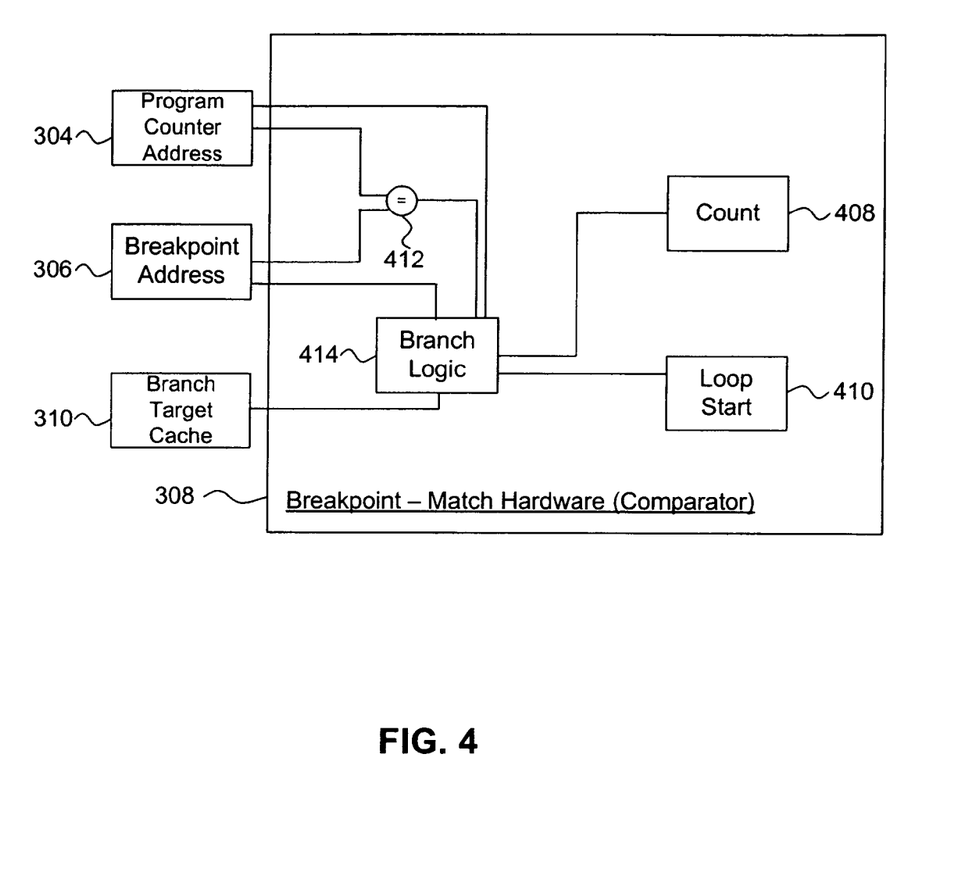
FIG. 4 depicts the basic elements of breakpoint match hardware used in an embodiment of the present invention.

FIG. 4 depicts an exemplary internal structure of breakpoint-match hardware 308 shown in FIG. 3. Breakpoint-match hardware 308 consists of a count register 408 and a loop start register 410. Breakpoint-match hardware 308 further comprises a logical comparator 412 and branch logic 414.

Breakpoint-match hardware 308, as previously shown in FIG. 3, is connected to PC address register 304 and breakpoint address register 306, allowing it to obtain the address values held by each. Furthermore, breakpoint-match hardware 308 is connected to branch-target cache 310.

Count register 408 and loop start register 410 are configured prior to execution of the code segment by a user as shown in steps 102 and 106 of FIG. 1. As previously noted, breakpoint-match hardware 308 is operable to perform step 108 of FIG. 1 in order to compare the address in breakpoint address register 306 to the address in PC address register 304 to determine whether the presently-executing instruction is the breakpoint. In the embodiment shown in FIG. 4, the comparison is performed by logical comparator 412. The result of the comparison is reported to branch logic 414.

When branch logic 414 receives the result of the comparison, it increments the address in PC address register 304 as indicated in step 110 of FIG. 1 if the address in PC address register 304 is not equivalent to the breakpoint. Otherwise, branch logic 414 is further operable to perform step 112 of FIG. 1 in order to determine whether the value held by count register 408 is greater than zero. One skilled in the relevant art(s) will appreciate, as previously noted, that the comparison with zero is used for the sake of simplification in order to indicate the point at which no further iterations of the loop are required. If the count is not greater than zero, as tested in step 112, then branch logic 414 increments the address in PC register 304.

If the count is greater than zero, branch logic 414 decrements the value in count register 408 as shown in step 114 in FIG. 1. Next, branch logic 414 sets the address in PC address register 304 to the value of the address in the loop start register 410 as shown in step 116 of FIG. 1, in accordance with an embodiment of the present invention. In accordance with an additional embodiment of the present invention, branch logic 414 sets the address in the PC address register 304 to the value of the address in breakpoint address register 306 minus an offset value held in the loop start register 410 as shown in step 116 of FIG. 1. Furthermore, branch logic 414 notifies branch-target cache 310 that a branching situation has occurred, triggering steps 202, 204, and 206 as shown in FIG. 2 within branch-target cache 310.

E. Context Switching

With continued reference to FIG. 4, the ZOL mechanism is designed in order to be compatible with a processor supporting multi-threaded software, in accordance with an embodiment of the present invention. In a multi-threaded environment, each thread will have its own current state for the PC address. When a thread is prepared for execution, its value for the PC address is substituted into the PC 304. However, in order for the ZOL mechanism to function in a multi-threaded environment, any data necessary for the ZOL mechanism to function for a particular thread is associated with that thread. In accordance with an embodiment of the present invention, a mechanism is provided to read the current state of the ZOL data, which includes the breakpoint address 306, the count 408, and the loop start 410.

When execution on a first thread is halted in favor of a second thread, the current state of ZOL data for the first (current) thread is read, and stored in association with the first thread's state, and then the ZOL mechanism is reconfigured with the ZOL data associated with the second thread, in accordance with an embodiment of the present invention. This mechanism allows for interrupts of ZOL operations such that each thread may concurrently utilize the ZOL hardware. Furthermore, a ZOL may be used within an interrupt subroutine, as the interrupted thread's ZOL data can be read at the start of the interrupt and restored at the end of the interrupt.

F. Dynamic Loops

To this point, the discussion has related to loops which, by their nature, must be configured such that they are processed in a preconfigured number of iterations. The instructions that become part of the loop have to be selected in advance, and the parameters necessary to define the bounds of the loop are also configured in advance.

Figure 5:
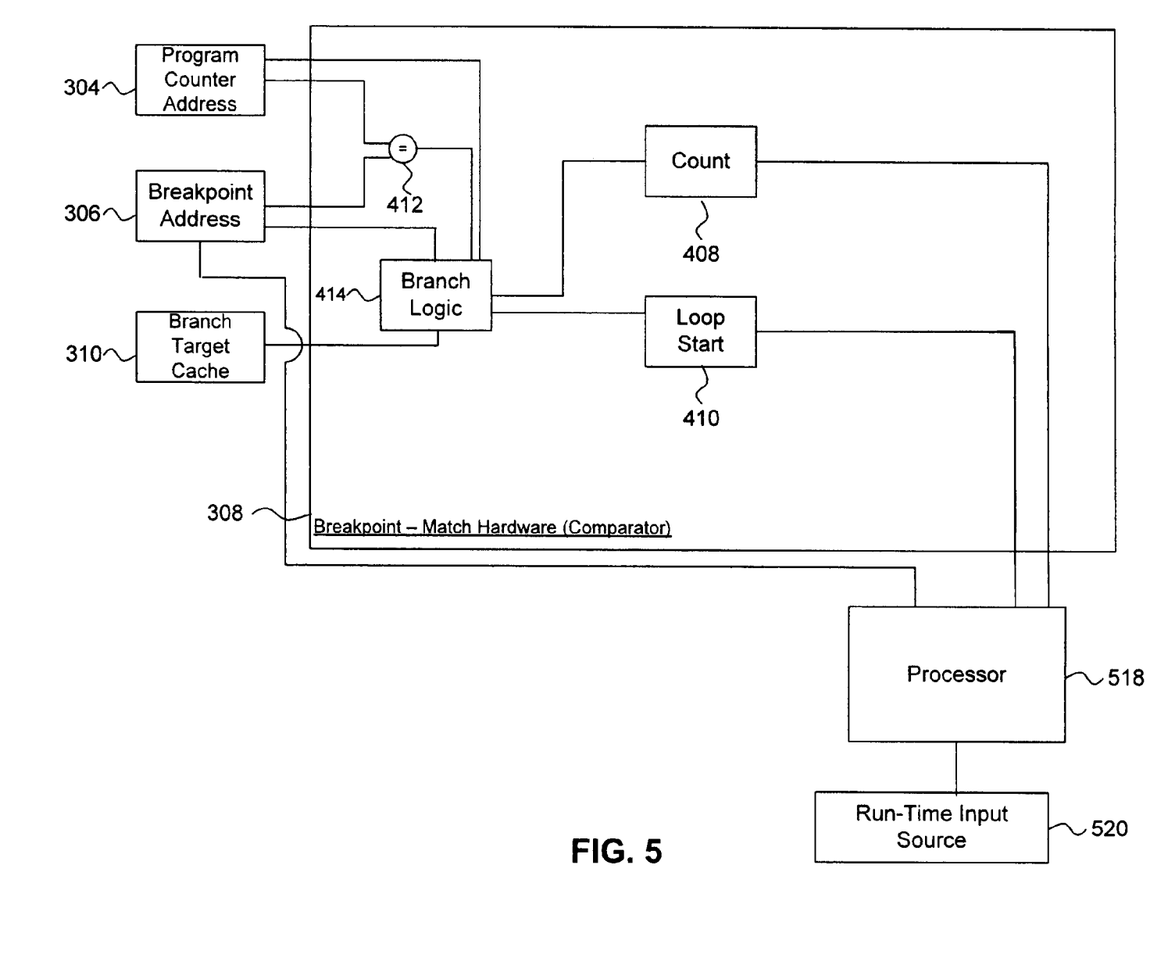
FIG. 5 depicts the basic elements of breakpoint match hardware used in another embodiment of the present invention.

FIG. 5 depicts breakpoint-match hardware 308 similar to the hardware in FIG. 4. In this example, a processor 518 is coupled to the breakpoint address register 306 and to a run-time input source 520. Run-time input source 520 refers to any input source from which processor 518 is operable to receive new values to store into the breakpoint-match hardware 308 and breakpoint address 306, and may be configured prior to the execution of a loop by the ZOL hardware or during execution.

Processor 518 is operable to receive the input 520 in order to modify the loop parameters on the fly by providing new values to breakpoint 306, count 408, and loop start 410. In some applications, it is desirable to perform a first sequence of instructions repeatedly as a first execution of a loop, then later perform a second sequence of instructions repeatedly as a second execution of the loop, where the first sequence of instructions and the second sequence of instructions are subsequences of a largest possible sequence of instructions in the loop. This can be accomplished by using the loop start 410 and the breakpoint address 306.

The loop start 410 is first configured with the address corresponding to the first instruction in the first sequence. Additionally the loop count 408 is set for the required number of iterations of the first execution of the loop, and the breakpoint address 306 is set to the address of the last instruction in the first sequence of instructions. The first execution of the loop is then initiated by branching to the first instruction of the first sequence. Later, at some time after the completion of the first execution of the loop, the loop start 410 is configured with the address corresponding to the first instruction in the second sequence. The loop count 408 is set for the required number of iterations of the second execution of the loop, and the breakpoint address 306 is set to the address of the last instruction in the second sequence of instructions. The second execution of the loop is then initiated by branching to the first instruction of the second sequence.

In an embodiment, all executions of the loop are arranged to have the same breakpoint address, since otherwise if one execution of the loop finishes before the end of the largest sequence of instructions in the loop, then after this execution of the loop, the remainder of the instructions in the largest sequence will still be executed once, which may be inconvenient.

For example, if one execution of a loop having instructions '1' through 'N' is capable of processing data blocks of a certain size (one loop iteration per data block), then the loop may be reused to process a number of smaller data blocks by executing a loop consisting only of instructions 'M' through 'N', where instruction 'M' is an instruction somewhere within the loop, in accordance with an embodiment of the present invention. One skilled in the relevant arts will appreciate that a number of applications may benefit from this usage, and this embodiment is presented by way of example only, and not limitation.

G. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A system implemented on an integrated circuit chip for processing a sequence of instructions, the system comprising:
    a program counter register configured to store an address for an instruction currently being processed;
    a loop counter register configured to store a number of times to process the sequence of instructions;
    a loop start register configured to store a reference to an address of a first instruction to execute within the sequence of instructions, wherein the reference to the address of the first instruction stored by the loop start register comprises an offset value that, when subtracted from the breakpoint address, results in the address of the first instruction of the sequence of instructions;
    an existing breakpoint-match hardware within a microprocessor comprising:
        a breakpoint register configured to store an address of a last instruction within the sequence of instructions, and
        a comparator configured to compare the address stored in the breakpoint register with the address stored in the program counter register;
    a pipeline comprising a plurality of pipeline stages; and
    a branch-target cache configured to retrieve one or more subsequent instructions from a cache and to place the subsequent instructions in the pipeline in parallel with the instruction currently being processed, the one or more subsequent instructions being selected from a set of instructions beginning with the first instruction, if the address stored in the program counter register is not same as the address stored in the breakpoint register and a next value of the address stored in the program counter, corresponding to the program counter offset by an address, is same as the address stored in the breakpoint register, and the loop counter indicates that the sequence of instructions must be processed at least once more;
    wherein the breakpoint-match hardware is configured to break execution of the sequence of instructions at the breakpoint and to set the program counter register to the address specified by the loop start register when the comparator determines that the address stored in the breakpoint register matches the address stored in the program counter register and the loop counter register indicates that the sequence of instructions must be processed at least once more.

2. The system of claim 1, wherein the branch-target cache is configured to read the loop counter register to determine whether the sequence of instructions will be processed again and, if so, retrieves the one or more subsequent instructions selected from a second set of instructions.

3. The system of claim 1, wherein the offset value comprises an absolute address value that is the address of the first instruction of the sequence of instructions, relative to the beginning of an address space.

4. An existing breakpoint mechanism within a microprocessor, comprising:
    a breakpoint address register configured to store a location of a last instruction in a sequence of instructions;

a loop count register configured to store a number of times to process instructions in the sequence of instructions;

a loop start register configured to store a reference to a location of a first instruction in the sequence of instructions, wherein the reference to the location of the first instruction stored by the loop start register comprises an offset value that, when subtracted from the breakpoint address, results in the address of the first instruction of the sequence of instructions;

a comparator configured to compare a current address of a program counter to the contents of the breakpoint address register, and further configured to, when the address stored in the program counter matches the address stored in the breakpoint address register, break execution of the sequence of instructions at the address stored in the breakpoint address register and to transmit a message indicating that the address stored in the program counter matches the address stored in the breakpoint address register, the comparator further configured to, when the address stored in the program counter does not match the address stored in the breakpoint address register and the address stored in the program counter offset by an address matches the address stored in the breakpoint address register, retrieve one or more subsequent instructions from a cache and place the one or more subsequent instructions in a pipeline, the one or more subsequent instructions being selected from a set of instructions beginning with the first instruction of the sequence of instructions, if the loop count register indicates that the sequence of instructions must be processed at least once more; and a branch logic that, responsive to receiving the message from the comparator, reads the loop count register to determine whether the loop should be processed again and, if so, reads the loop start register in order to determine the address of a next instruction for processing, and updates the program counter.

* * * * *